(12) United States Patent
Kimball et al.

(10) Patent No.: US 11,493,063 B1
(45) Date of Patent: Nov. 8, 2022

(54) LIGHTWEIGHT COMPOSITE ACTUATOR

(71) Applicant: Trelleborg Sealing Solutions Germany GmbH, Stuttgart (DE)

(72) Inventors: Brett Arnold Kimball, Loudonville, NY (US); Michael James Pasanen, Troy, NY (US)

(73) Assignee: Trelleborg Sealing Solutions Germany GmbH, Stuttgart (DE)

( * ) Notice: Subject to any disclaimer, the term of this patent is extended or adjusted under 35 U.S.C. 154(b) by 0 days.

(21) Appl. No.: 17/647,437

(22) Filed: Jan. 7, 2022

(51) Int. Cl.
*F15B 15/14* (2006.01)
*F16J 10/04* (2006.01)

(52) U.S. Cl.
CPC .......... *F15B 15/1438* (2013.01); *F16J 10/04* (2013.01); *F15B 2215/305* (2013.01)

(58) Field of Classification Search
CPC .............................. F15B 15/1438; F16J 10/04
See application file for complete search history.

(56) References Cited

U.S. PATENT DOCUMENTS

| | | |
|---|---|---|
| 4,685,384 A | 8/1987 | Dirkin et al. |
| 4,773,282 A | 9/1988 | Benton et al. |
| 4,777,869 A | 10/1988 | Dirkin et al. |
| 4,802,404 A | 2/1989 | Dirkin et al. |
| 4,872,370 A | 10/1989 | Benton et al. |
| 4,971,846 A | 11/1990 | Lundy |
| 5,101,556 A | 4/1992 | Fluga et al. |
| 5,154,109 A | 10/1992 | Fluga et al. |
| 5,415,079 A | 5/1995 | Ching |
| 6,877,398 B2 | 4/2005 | Wirtz et al. |
| 6,978,711 B1 | 12/2005 | Van der Blom |
| 7,278,788 B2 | 10/2007 | Fish et al. |
| 7,617,874 B2 | 11/2009 | Ocalan |
| 8,991,299 B2 | 3/2015 | Gage et al. |
| 9,611,935 B2 | 4/2017 | Kabir et al. |
| 9,638,323 B2 | 5/2017 | Braun et al. |
| 9,873,506 B2 | 1/2018 | Goldring et al. |
| 10,066,649 B2 | 9/2018 | Ganis et al. |
| 10,190,607 B2 | 1/2019 | Goldring et al. |
| 10,295,059 B2 | 5/2019 | Pirri et al. |
| 10,612,568 B2 | 4/2020 | Giannakopoulos et al. |
| 2002/0170426 A1 | 11/2002 | Braatz |
| 2006/0016329 A1 | 1/2006 | Johnson |
| 2009/0255400 A1 | 10/2009 | Fish |
| 2020/0291969 A1 | 9/2020 | Goldring et al. |
| 2021/0156471 A1 | 5/2021 | Lee et al. |

*Primary Examiner* — Michael Leslie
(74) *Attorney, Agent, or Firm* — Hackler Daghighian Martino & Novak (57) ABSTRACT

A dual-direction piston-based actuator housing assembly has a housing disposed over a hollow cylindrical liner configured to accept within a movable piston. A compression block having a pin engagement hole is disposed adjacent to a proximal end of the liner. A tension strap is disposed over the compression block, the tension strap starting from a first end near the proximal end of the liner, extending around the engagement hole and back to a second end near the proximal end of the liner. An overwind extends over the first and second ends of the tension strap, over the compression block, and over the proximal end of the housing. A tension clip is disposed at the distal end of the liner and embedded within the housing. The housing, tension strap and overwind may be a continuous fiber reinforced plastic composite and the compression block may be a chopped fiber filled thermoplastic composite.

20 Claims, 4 Drawing Sheets

LIGHTWEIGHT COMPOSITE ACTUATOR

CROSS-REFERENCE TO RELATED APPLICATIONS

None.

DESCRIPTION

Field of the Invention

The present invention generally relates to actuators. More particularly, the present invention relates to a lightweight actuator housing assembly utilizing advanced composites and manufacturing techniques.

Background of the Invention

Some manufacturers produce lightweight actuators by using a thin-walled metal liner for the cylinder that is then overwrapped with composites, such as fiber reinforced composites, for added strength. However, these actuators also use metal end pieces to manage the various three-dimensional stresses incurred. These end pieces, such as the clevis and rod ends, have considerable weight. Therefore, the overall weight of the actuator is still higher than desired.

Accordingly, there still exists a need for even lighter actuators that ultimately lead to substantial weight savings, especially considering the numerous amount of actuators that may be utilized in a particular vehicle, such an airplane. The present invention fulfills these needs and provides other related advantages.

SUMMARY OF THE INVENTION

A dual-direction piston-based actuator housing assembly of the present invention is taught herein. The actuator housing assembly is generally made from the following major components: a tension strap, a compression block, a piston housing, a liner, an overwind layer and a tension clip. The components (except the tension clip) are each made from fiber reinforced thermoplastic composite materials, thus enabling a weight savings over prior art designs.

In addition to the novel design and material selection of the various components of the actuator housing assembly, the present invention uses an Automated Fiber Placement (AFP) manufacturing process to combine and adjoin Continuous Fiber Reinforced Plastic (CFRP) composite structural elements. The present invention facilitates translating tensile stress in the tension strap to tensile stress in the cylinder housing, through the Automated Fiber Placement, by including a compression block as a substrate and an overwind layer as a structural element. Furthermore, the present invention enables translating compressive stress via the compression block to the clevis pin, while the overwind prevents expansion of the compression block.

It will be understood by those skilled in the art that several configurations and/or design offshoots could be devised which are not fully pictured, including the potential for a tension strap that winds all the way around the compression block to further solidify structural elements together. In a further embodiment, the tension strap may utilize continuous fibers which run from the strap to the rod end of the piston housing and changes angle over a given axial distance, to then wind around the housing to better solidify and secure the components together.

It is understood that this teaching is primarily focused on the actuator housing assembly. Accordingly, it is known to those skilled in the art that the actuator housing assembly is only part of a fully functioning actuator which would include several other components including but not limited to the following: a piston, a piston rod, a balance tube, static seals, dynamic seals, input and output fluid ports and/or a position sensor.

The dual-direction aspect is belabored due to highly anisotropic nature of the materials used in the present invention. This is significant since the actuator housing assembly will be loaded in separate scenarios of tension and compression to provide dual direction linear motion. Traditional metallic structural elements have nearly isotropic strengths (i.e. same strength in all directions) such dual direction loading is less a design consideration. However, with the composite mechanical behavior of the present invention being drastically different when a fiber is loaded in either tension, compression, or traverse (across fiber) loading, the design must accommodate each loading case and accordingly use separate structural elements for separate cases.

The use of Automated Fiber Placement via robotic equipment is used to either: 1) melt-bond a preimpregnated CFRP tape to a thermoplastic substrate, which may be previous tape layer, an all-thermoplastic element, or a chopped fiber filled thermoplastic element; or 2) mechanically wrap and grip the tape around a metallic element such as the tension clip.

Tension Strap:

The tension strap is part of the actuator's clevis, the clevis being a structural element with a hole designed for a mating pin or shaft to transfer a load from the pin/shaft to structure. The load is translated from the pin to the clevis via bearing stress and transfers up the structural element of the clevis. In the present invention, that structural element in the tension loading scenario is the tension strap. Here, the tension strap can be made without co-curing elements, as with competing thermoset materials, which then removes the problem of mismatched thermal expansion rates across components and the subsequent debonding of structural elements from each other.

For a thermosetting type of polymer, such as epoxy, during the layup process (and it doesn't matter what layup method is used, including AFP), the resin is in a 'precursor' state, in that it is not a polymer at this point, but rather many smaller molecules that need to be combined to make the polymer. This state makes the resin soft and pliable, allowing it to be shaped as required by the part. In order to make the resin into a true polymer, it must go through a chemical reaction (called curing) that combines these relatively small molecules into the large molecules that are the polymer. This chemical reaction requires some catalyst to make the reaction happen. This often includes heat. When more than one part goes through the curing process together, with the intent to make it a single part, this is called co-curing. When components of different materials, such as composite components and metal components are co-cured, all of the components go through the same heating and cooling cycle. In many cases the amount of expansion due to temperature change in the different materials can be significant.

For the tension loading scenario, the tension strap transfers tension load in the strap by shearing it through the bonded surfaces of both the compression block and the overwind. Furthermore, as shown herein, the strap may be slightly wedge-shaped in the circumferential or radial direction to further impart shearing load onto these two adjacent elements.

For the compression loading scenario, the piston disposed within the housing travels away from the clevis end and loads the compression block, which in turn loads the pin through the clevis hole. It is the overwind which then keeps the compression block from expanding.

Compression Block:

In one embodiment, the compression bock is designed with chopped fiber filled thermoplastic composite and services to both transfer load between internal piston fluid and clevis pin (pin in hole not pictured) for the compression loading configuration, and secondly, to be the substrate for the tension strap of a same resin base, thus ensuring tension strap stay in place during tension load configuration.

Piston Liner and Housing:

The liner and the housing components are manufactured sequentially, for example, with AFP. The liner serves as a smooth sliding seal surface for the piston traveling within and also a polymeric barrier for fluid containment. The liner material comes in a tape form similar to the CFRP material. The liner may have a solid lubricant dispersed throughout the thermoplastic to reduce coefficient of friction. The housing is comprised of CFRP and is melt-bonded to a polymer liner or a neat polymer liner of same resin, ensuring a solidified single structural element. A neat polymer is essentially a polymer without any fillers or reinforcements, that is no fibers either continuous or short fibers. Liner material options include polymers, neat polymers, neat polymers with solid internal lubricant, CFRP (composite), ceramics and/or metal.

Overwind Layer:

The overwind layer ties the tension strap and compression block to the piston housing and provides radial compressive force on the tension strap to secure it to the compression block for both loading scenarios. The overwind layer of the present invention is preferably done with Automated Fiber Placement.

Tension Clip:

This structural element (currently only metallic component of the invention) translates a massive shear load imparted on the clip, over a very small area of the clip, into a normal bearing stress between the tension clip and the adjacent composite housing. Metal is used currently to withstand the high shear stress induced. This may include aluminum, titanium or steel. In another embodiment, a 3D woven composite tension clip may withstand such high shear stress as well as a metal, but is not yet part of the current design.

It will be understood by those skilled in the art that a thermoplastic composite balance tube and/or a thermoplastic composite piston may be used.

Optionally a composite through wall port for fluid connections may be used.

Optionally, multiple materials such as fiberglass, aramid fiber, boron fiber may be used to improve damage tolerance, damage detection, controlled failure modes.

Optionally, a low friction liner may be used for the cylinder, rod and balance tube, such as but not limited to, fluoropolymer, graphite and molydenum disulfide filled polymer.

The radial holes pictured in the figures are the various input and output fluid ports that are used to form the overall actuator assembly. Therefore, it is understood by those skilled in the art that their number of and placement of could vary depending on the specific actuator being designed.

It is noted that the present invention is intended to be used with hydraulics, but could be utilized to work with pneumatics.

In summary, the present invention has, but is not limited to, the following advantages: lower weight; improved damage tolerance over thermoset composites; improved fatigue life; improved corrosion resistance, chemical and environmental resistance; lower friction for greater efficiency; recyclability; and safety (fail gracefully, not catastrophically).

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
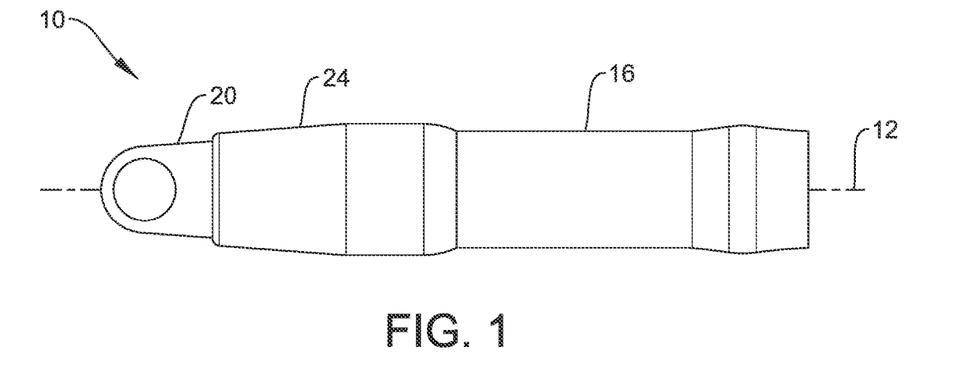
FIG. 1 is a side view of a dual-direction piston-based actuator housing assembly of the present invention.
Figure 2:
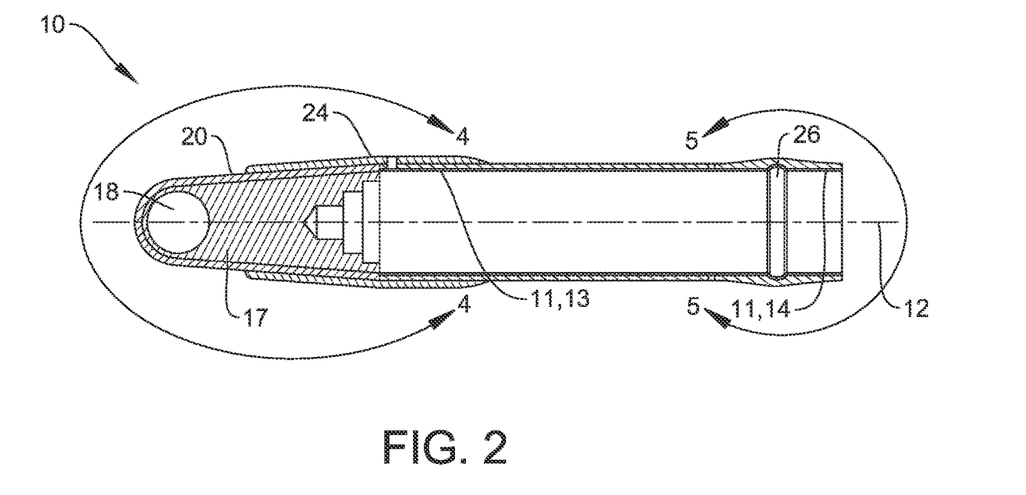
FIG. 2 is a cross section side view of the structure of FIG. 1.
Figure 3:
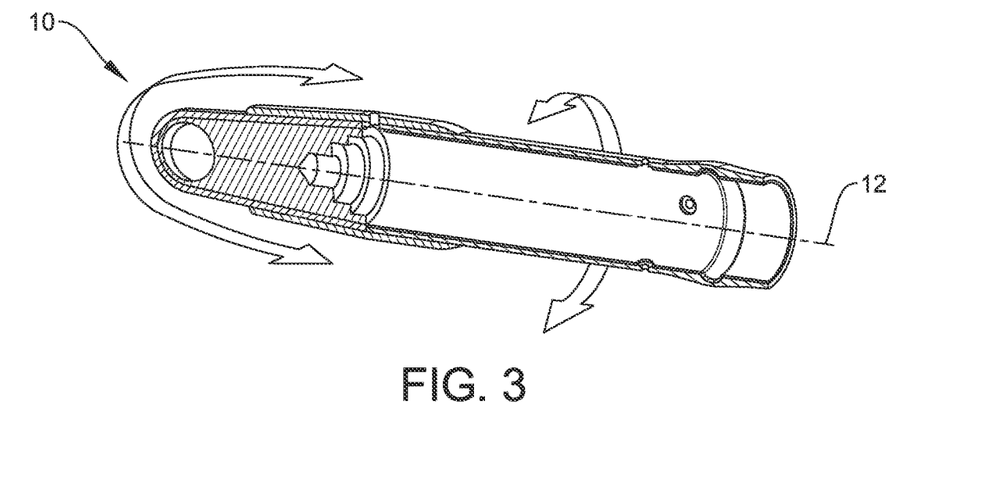
FIG. 3 is the cross section side view of FIG. 3 now in a perspective view.

An exemplary embodiment of the present invention is shown in FIGS. 1-7 disclosing a dual-direction piston-based actuator housing assembly 10. As best shown in FIG. 2, a hollow cylindrical liner 11 extends along a longitudinal axis 12 defining a proximal end 13 opposite a distal end 14. The liner may be made from graphite, molydenum disulfide filled polymer, fluoropolymer, PEEK, polymers, neat polymers, neat polymers with solid internal lubricant, CFRP (composite) or even metal.

Figure 4:
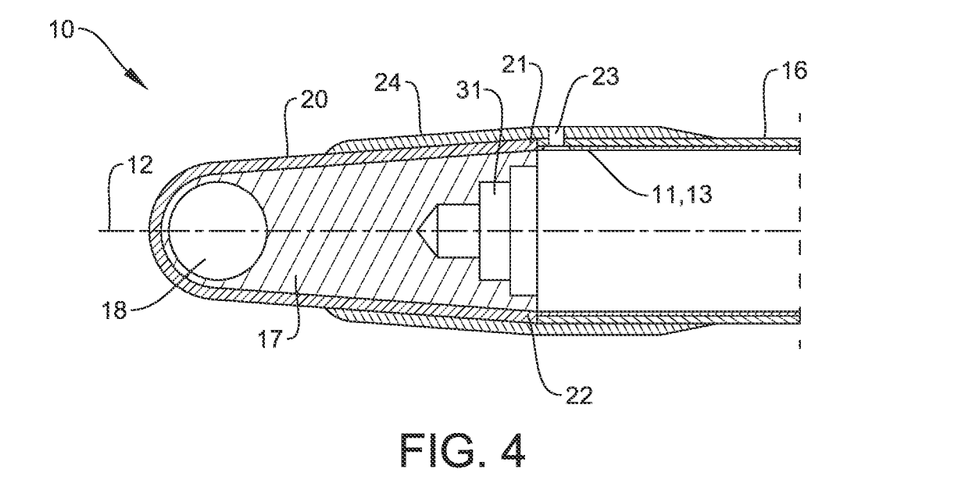
FIG. 4 is an enlarged view taken along lines 4-4 of FIG. 2.

As best shown in FIG. 4, a housing 16 is disposed over the liner also extending along the longitudinal axis from the proximal end to the distal end of the liner 11. The housing 16 may be made from a continuous fiber reinforced plastic composite, where the continuous fiber reinforced plastic composite of the housing comprises a plurality of continuous fibers wrapped about the longitudinal axis. Furthermore, the liner and the housing may be made from a same base resin, as this reduces any mismatches due to differing thermal expansion coefficients. Furthermore, the housing may be melt-bonded to the liner.

Figure 7:
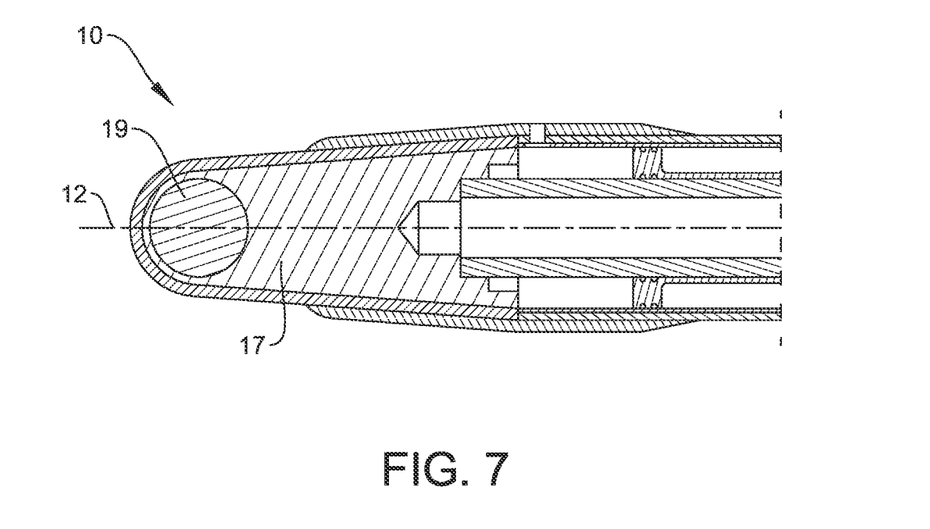
FIG. 7 is an enlarged view similar to that of FIG. 4 now showing additional parts disposed therein.

A compression block 17 is disposed adjacent to the proximal end of the liner. An engagement hole 18 is formed in the compression block configured to accept a pin 19 for attachment when in use as is best shown in FIG. 7. The compression bock may be made from a chopped fiber filled thermoplastic composite as its loading is mostly in compression due to the design of the present invention.

Referring back to FIG. 4, a tension strap 20 is disposed over the compression block. The tension strap starts from a first end 21 near the proximal end of the liner and extends around the engagement hole and back to a second end 22 also near the proximal end of the liner. The first end and second end are opposite one another disposed approximately 180 degrees apart about the longitudinal axis. The tension strap may be made from a continuous fiber reinforced plastic composite. For example, the continuous fiber reinforced plastic composite of the tension strap may comprise a plurality of continuous fibers starting from the first end, extending around the engagement hole of the compression block and extending to the second end. Alternatively not shown, the tension strap 20 could also extend onto the housing 16.

In other embodiments, the tension strap may be wedge-shaped in a circumferential or a radial direction at the first and second ends, as this helps secure the tension strap in position once the overwind is later applied as discussed below. Furthermore, the tension strap may not comprise co-curing elements as was done in the prior art. Furthermore, the tension strap and the compression block may comprise a same resin base, as this reduces any mismatches due to differing thermal expansion coefficients.

An overwind 24 extends at least over the first and second ends of the tension strap, at least partially over the compression block, and at least partially over the proximal end of the housing. The overwind secures the tension strap to the compression block while also securing the tension strap and compression block to the housing and liner. The overwind may be made from a continuous fiber reinforced plastic composite, where the continuous fiber reinforced plastic composite of the overwind comprises a plurality of continuous fibers wrapped about the longitudinal axis.

Figure 5:
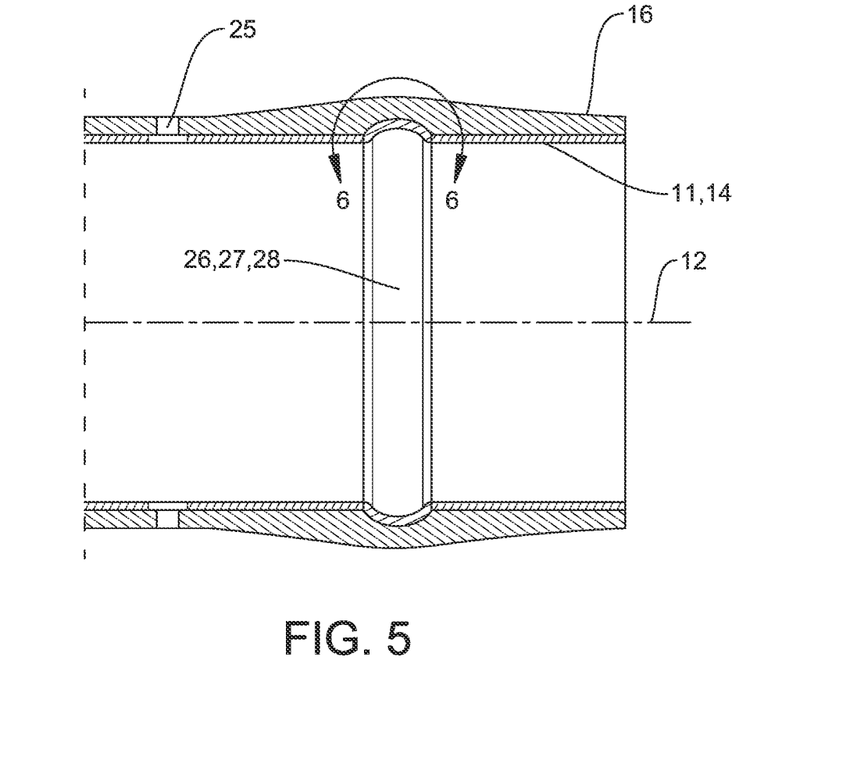
FIG. 5 is an enlarged view taken along lines 5-5 of FIG. 2.
Figure 6:
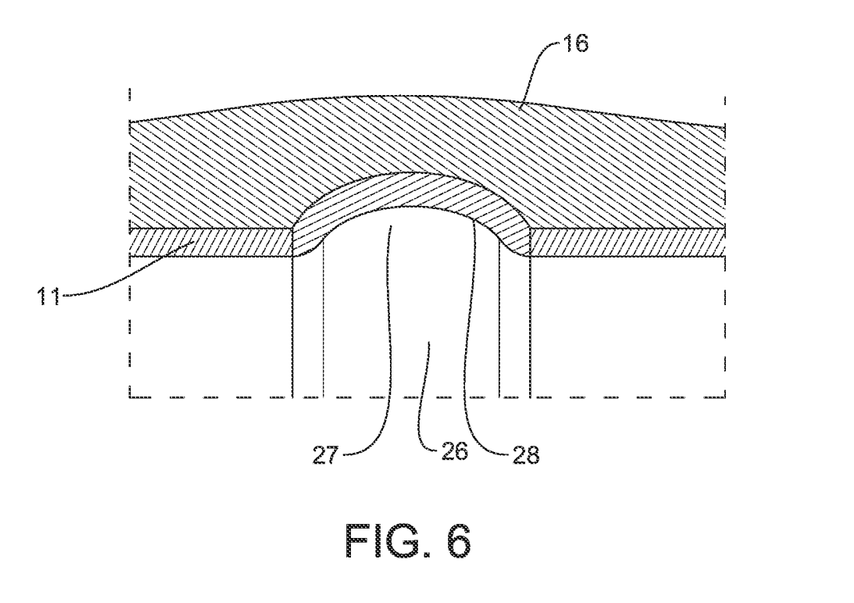
FIG. 6 in an enlarged view taken along lines 6-6 of FIG. 5.

As best shown in FIGS. 5 and 6, a tension clip 26 is disposed at the distal end of the liner and embedded within the housing. The tension clip has a recess 27 formed on an inside surface 28 of the tension clip. The recess is annularly disposed about the longitudinal axis. The tension clip may be made from a metal, such as aluminum, titanium or steel.

As best shown in FIG. 7, the liner is configured to accept a movable piston 15 disposed therein. An axial support 30 keeps the piston aligned in relation to the liner. The axial support 30 is supported in a recess 31 (See FIG. 4) of the compression block 17. Generally speaking in terms of how a dual-direction piston-based actuator housing assembly works, pressure is created on both sides of the piston through a variety of ports. As shown herein, a proximally disposed port 23 (See FIG. 4) and a distally disposed port 25 (See FIG. 5) allow pressure to be created on either side of the piston, which in turn moves the piston along the longitudinal axis to create movement. It will be understood by those skilled in the art that a multitude of ports could be used rather than just a single port on each side of the movable piston 15.

As shown herein, the dual-direction piston-based actuator housing assembly 10 is generally made up of cylindrical parts, such that the parts are circular in cross section. However, it will be understood by those skilled in the art that keeping consistent with this disclosure other non-cylindrical shapes could be made such that the cross sections are oval, triangular, square, rectangular or polygonal such as pentagons, hexagons, octagons and the like.

Figure 8:
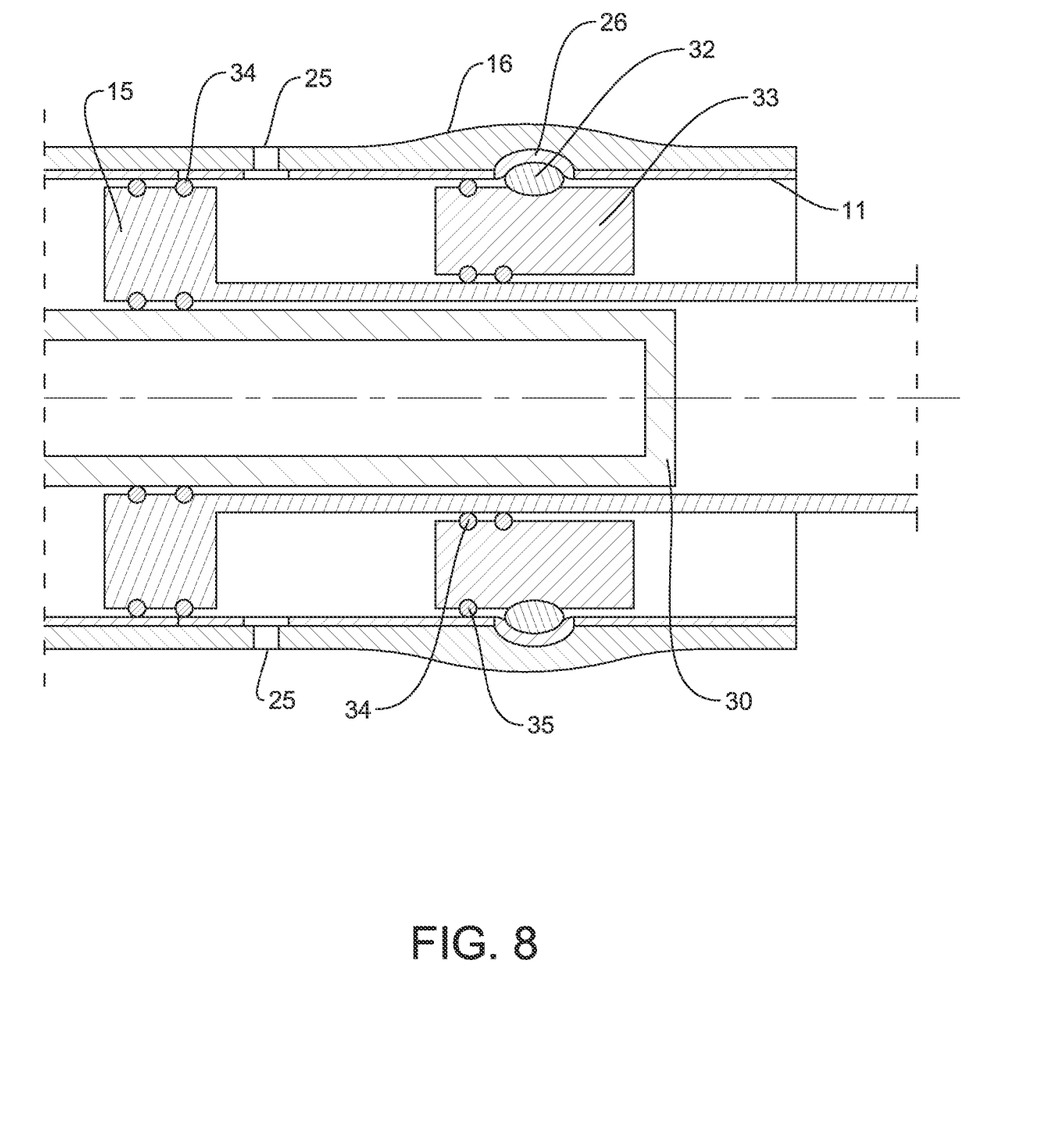
FIG. 8 is an enlarged view similar to that of FIG. 5 now showing additional parts disposed therein.

FIG. 8 is an enlarged view similar to FIG. 5 now showing additional parts disposed therein. The piston 15 has a multitude of dynamic seals 34, shown herein as o-rings, which create a pressurized seal between the piston 15 and the hollow cylindrical liner 11 or the axial support (i.e. balance tube) 30. The seals 34 are dynamic in that movement occurs relative to the seals when the piston 15 moves relative to the liner and the axial support.

Also shown herein is a gland 33, which has a static seal 35 on one side and then a dynamic seal 34 on the other side. The static seal 35 is static in that it does not have any movement relative to its use and structural position. On the other hand, the dynamic seals 34 of the gland 33 see movement as the piston moves thereby. It will be understood by those skilled in the art that any number of static and/or dynamic seals could be used with the present invention as the invention is not to be limited to the precise forms shown and taught herein.

The gland 33 is locked into place by a retaining clip 32 which engages both the gland and the tension clip 26. In this manner, the gland is locked into position such that it cannot move within or relative to the liner 11 and housing 16. It is also understood that the retaining clip 32 may be introduced (or removed) into its position from a side hole (not shown) through the housing and liner.

Although several embodiments have been described in detail for purposes of illustration, various modifications may be made to each without departing from the scope and spirit of the invention. Accordingly, the invention is not to be limited, except as by the appended claims.

NUMERALS 10 dual-direction piston-based actuator housing assembly
11 hollow cylindrical liner
12 longitudinal axis
13 proximal end, liner
14 distal end, liner
15 piston
16 housing
17 compression block
18 engagement bole
19 pin
20 tension strap
21 first end, tension strap
22 second end, tension strap
23 port, proximal end
24 overwind
25 port, distal end
26 tension clip
27 recess, tension clip
28 inside surface, tension clip
30 axial support (i.e. balance tube)
31 recess, compression block
32 retaining clip
33 gland
34 dynamic seal, o-ring
35 static seal, o-ring

What is claimed is:
1. A dual-direction piston-based actuator housing assembly, comprising:
   a hollow cylindrical liner extending along a longitudinal axis defining a proximal end opposite a distal end, wherein the liner is configured to accept a movable piston disposed therein;
   a housing disposed over the liner also extending along the longitudinal axis from the proximal end to the distal end;
   a compression block disposed adjacent to the proximal end of the liner;

an engagement hole formed in the compression block configured to accept a pin for attachment when in use;

a tension strap disposed over the compression block, the tension strap starting from a first end near the proximal end of the liner, extending around the engagement hole and back to a second end near the proximal end of the liner, wherein the first end and second end are opposite one another disposed 180 degrees apart about the longitudinal axis;

an overwind extending at least over the first and second ends of the tension strap, at least partially over the compression block, and at least partially over the proximal end of the housing; and a tension clip disposed at the distal end of the liner and embedded within the housing, the tension clip having a recess formed on an inside surface of the tension clip, the recess annularly disposed about the longitudinal axis.

2. The actuator housing assembly of claim 1, wherein the tension strap comprises a continuous fiber reinforced plastic composite.

3. The actuator housing assembly of claim 2, wherein the continuous fiber reinforced plastic composite of the tension strap comprises a plurality of continuous fibers starting from the first end, extending around the engagement hole of the compression block and extending to the second end.

4. The actuator housing assembly of claim 3, wherein the tension strap is wedge-shaped in a circumferential or a radial direction at the first and second ends.

5. The actuator housing assembly of claim 2, wherein the tension strap does not comprise co-curing elements.

6. The actuator housing assembly of claim 1, wherein the compression bock comprises a chopped fiber filled thermoplastic composite.

7. The actuator housing assembly of claim 1, wherein the tension strap and the compression block comprise a same base resin.

8. The actuator housing assembly of claim 1, wherein the liner comprises graphite, molydenum disulfide filled polymer, fluoropolymer or PEEK.

9. The actuator housing assembly of claim 1, wherein the liner and the housing comprise a same base resin.

10. The actuator housing assembly of claim 1, wherein the housing is melt-bonded to the liner.

11. The actuator housing assembly of claim 1, wherein the overwind comprises a continuous fiber reinforced plastic composite.

12. The actuator housing assembly of claim 11, wherein the continuous fiber reinforced plastic composite of the overwind comprises a plurality of continuous fibers wrapped about the longitudinal axis.

13. The actuator housing assembly of claim 1, wherein the housing comprises a continuous fiber reinforced plastic composite.

14. The actuator housing assembly of claim 13, wherein the continuous fiber reinforced plastic composite of the housing comprises a plurality of continuous fibers wrapped about the longitudinal axis.

15. The actuator housing assembly of claim 1, wherein the tension clip comprises a metal.

16. A dual-direction piston-based actuator housing assembly, comprising:

a hollow cylindrical liner extending along a longitudinal axis defining a proximal end opposite a distal end, wherein the liner is configured to accept a movable piston disposed therein;

a housing disposed over the liner also extending along the longitudinal axis from the proximal end to the distal end, wherein the housing comprises a continuous fiber reinforced plastic composite, wherein the continuous fiber reinforced plastic composite of the housing comprises a plurality of continuous fibers wrapped about the longitudinal axis;

a compression block disposed adjacent to the proximal end of the liner, wherein the compression bock comprises a chopped fiber filled thermoplastic composite and wherein the compression block includes an engagement hole formed in the compression block configured to accept a pin for attachment when in use;

a tension strap disposed over the compression block, the tension strap starting from a first end near the proximal end of the liner, extending around the engagement hole and back to a second end near the proximal end of the liner, wherein the first end and second end are opposite one another disposed 180 degrees apart about the longitudinal axis, wherein the tension strap comprises a continuous fiber reinforced plastic composite, wherein the continuous fiber reinforced plastic composite of the tension strap comprises a plurality of continuous fibers starting from the first end, extending around the engagement hole of the compression block and extending to the second end;

an overwind extending at least over the first and second ends of the tension strap, at least partially over the compression block, and at least partially over the proximal end of the housing, wherein the overwind comprises a continuous fiber reinforced plastic composite, wherein the continuous fiber reinforced plastic composite of the overwind comprises a plurality of continuous fibers wrapped about the longitudinal axis; and a tension clip disposed at the distal end of the liner and embedded within the housing, the tension clip having a recess formed on an inside surface of the tension clip, wherein the recess is annularly disposed about the longitudinal axis.

17. The actuator housing assembly of claim 16, wherein the liner and the housing comprise a same first base resin.

18. The actuator housing assembly of claim 17, wherein the tension strap and the compression block comprise a same second base resin.

19. A dual-direction piston-based actuator housing assembly, comprising:

a hollow cylindrical liner extending along a longitudinal axis defining a proximal end opposite a distal end, wherein the liner is configured to accept a movable piston disposed therein;

a housing disposed over the liner also extending along the longitudinal axis from the proximal end to the distal end, wherein the housing comprises a continuous fiber reinforced plastic composite, wherein the continuous fiber reinforced plastic composite of the housing comprises a plurality of continuous fibers wrapped about the longitudinal axis;

a compression block disposed adjacent to the proximal end of the liner, wherein the compression bock comprises a chopped fiber filled thermoplastic composite and wherein the compression block includes an engagement hole formed in the compression block configured to accept a pin for attachment when in use;

a tension strap disposed over the compression block, the tension strap starting from a first end near the proximal end of the liner, extending around the engagement hole and back to a second end near the proximal end of the liner, wherein the first end and second end are opposite one another disposed 180 degrees apart about the longitudinal axis, wherein the tension strap comprises a continuous fiber reinforced plastic composite, wherein the continuous fiber reinforced plastic composite of the tension strap comprises a plurality of continuous fibers starting from the first end, extending around the engagement hole of the compression block and extending to the second end; and an overwind extending at least over the first and second ends of the tension strap, at least partially over the compression block, and at least partially over the proximal end of the housing, wherein the overwind comprises a continuous fiber reinforced plastic composite, wherein the continuous fiber reinforced plastic composite of the overwind comprises a plurality of continuous fibers wrapped about the longitudinal axis;

wherein the liner and the housing comprise a same first base resin; and wherein the tension strap and the compression block comprise a same second base resin.

20. The actuator housing assembly of claim 19, including a tension clip disposed at the distal end of the liner and embedded within the housing, the tension clip having a recess formed on an inside surface of the tension clip, wherein the recess is annularly disposed about the longitudinal axis, and wherein the tension clip comprises a metal.

* * * * *

UNITED STATES PATENT AND TRADEMARK OFFICE
CERTIFICATE OF CORRECTION

PATENT NO. : 11,493,063 B1
APPLICATION NO. : 17/647437
DATED : November 8, 2022
INVENTOR(S) : Brett Arnold Kimball and Michael James Pasanen It is certified that error appears in the above-identified patent and that said Letters Patent is hereby corrected as shown below:

In the Specification

Column 3, Line 10, "bock" should read --block--.

Column 4, Line 65, "bock" should read --block--.

In the Claims

Column 7, Claim 6, Line 34, "bock" should read --block--.

Column 7, Claim 8, Line 40, "molydenum" should read --molybdenum--.

Column 8, Claim 16, Line 9, "bock" should read --block--.

Column 8, Claim 19, Line 60, "bock" should read --block--.

Signed and Sealed this
Third Day of January, 2023

Katherine Kelly Vidal
*Director of the United States Patent and Trademark Office*